Sept. 24, 1963   P. GROSS   3,104,956
AUTOMATIC CONTROL DEVICES FOR USE IN CYCLIC PROCESSES
Filed March 24, 1961

Inventor
Pierre Gross
By
Michael S. Striker
Attorney

United States Patent Office 3,104,956
Patented Sept. 24, 1963

3,104,956
AUTOMATIC CONTROL DEVICES FOR USE IN CYCLIC PROCESSES
Pierre Gross, Paris, France, assignor to Stein et Roubaix, Paris, France, a company of France
Filed Mar. 24, 1961, Ser. No. 98,178
Claims priority, application France Apr. 6, 1960
4 Claims. (Cl. 48—87)

Many operations in physico-chemical processes are performed discontinuously in accordance with cyclic processes in which each cycle usually consists of an operative or production phase in which some physical quantity varies, one or more regenerative phases in which a correction is made to said quantity and, if necessary, intermediate phases therebetween.

Thus, for example, in methods of manufacturing or converting industrial gases by the cyclic process, with or without a catalyst, the following cycle, to within certain variants, is caused to be performed in a reaction chamber:

(1) A manufacturing phase in the course of which the desired reaction is performed, and since this reaction is endothermic the reaction chamber is cooled;

(2) An intermediate draining phase which, depending on the method used, can itself be decomposed into a plurality of stages which will differ according to the nature of the fluid (air or steam), and its rate of flow, method of introduction, direction of circulation, etc.;

(3) A heating phase during which the reaction chamber recovers the calories given out during the production phase, these calories being increased by the different losses sustained during the complete cycle;

(4) A further intermediate draining phase.

It is current practice to use automatic mechanical control devices which determine the succession of phases in accordance with some preset time-lapse allotted to each. This is known as a chronometric cycle. It is clear that, under such conditions, operation will be stable once the steady state is reached, that is to say after operation has been under way long enough to permit a set of given adjustments to be made, and providing the conditions of operation are not subsequently modified either fortuitously or intentionally.

On the other hand, any change in one of the adjustment parameters will displace the thermal equilibrium of the whole system, making production sensitive to quality variations in the raw materials and rendering methodical adjustment extremely difficult, due to the fact that any modification to an adjustment produces a shift in the mean reaction temperature.

In his French patent Serial Number 1,113,683, filed on November 23, 1954, the applicant disclosed an automatic control device enabling this drawback to be overcome. To this end, a pyrometric probe is arranged at a given point in the reaction chamber and the duration of the heating and production phases are both controlled in accordance with the temperatures measured thereon. Under such conditions, once the production phase has been started it is pursued until the pyrometer detects a predetermined temperature $T_1$. A device is then brought into play to control the various draining operations for a given time before it triggers the hearing phase.

The heating phase is in turn pursued, without any consideration of time, until the same pyrometer detects a second temperature $T_2$, which is evidently greater than $T_1$. A further timed sequence causes draining operations to take place once more, before the production phase is triggered whereupon a fresh cycle begins.

Such an arrangement overcomes the drawbacks referred to precedingly and imparts great flexibility to the cyclic process. Indeed it enables the optimum reaction temperature to be obtained after a long period of idleness as soon as the first cycles are completed, without having to wait for the normal working temperature to be reached. It also enables a methodical adjustment to be made, due to the absence of any interaction between the various adjustment parameters. Lastly, such an arrangement provides compensation, to a large extent, and without further intervention, for any variations in raw material characteristics.

In certain processes, however, particularly in modern plants for the catalytic transformation of hydrocarbons, it has been found best to adopt relatively short cycles, usually of the order of 3½ to 5 minutes, and it has been found that, under such conditions, the response time of the pyrometric equipment used is by no means negligible in relation to the duration of the cycle.

This in turn led to a common value T being adopted for the temperatures $T_1$ and $T_2$, and this value T affects the ratio of the heating phase time to the production phase time. However, the individual values of these times become dependent upon the degree of wear or fouling of the protective devices provided for the thermocouple. This in turn makes possible problematical and uncontrollable variations in the total duration of the cycle which, notwithstanding the fact that the mean reaction temperature is in principle maintained unchanged, are not without having certain secondary effects on the final results obtained.

With a view to overcoming this drawback, the present invention has for its object an automatic control device in which the variable physical quantity is compared with a preset value, so as to modify the ratio between the durations of the phases of variation of the physical quantity and of correction of that quantity, without affecting the sum of those durations, the durations of any intermediate phases being controlled chronometrically.

In the specific case under consideration, involving a cyclic method of manufacturing or transforming industrial gases, the phase of variation is the endothermic manufacturing phase while the phase of correction is the heating phase, the variable physical quantity being the temperature. The indications given by the pyrometer detecting the difference between the reaction chamber temperature and the preset temperature serve to modify the ratio between the durations of the heating and manufacturing phases respectively.

Such a cycle, the total duration of which is constant but the heating and manufacturing phases of which are variable, offers a number of advantages over the types of cycle referred to precedingly.

Thus the reaction temperature is preset and remains unaffected by action upon some other adjustment parameter, the reaction temperature being obtained as soon as the plant is set in operation, without waiting for normal working conditions to be reached. Similarly, any accidental setting out of adjustment or fortuitous quality fluctuations in the raw materials are to a great extent offset by an automatic modification of the duration of the heating and manufacturing phases in the cycle.

In comparison with the pyrochronometric cycle of variable duration, the cycle obtained in accordance with the present invention offers the advantage of being virtually insensitive to the response characteristics of the thermocouple, thereby enabling the pyrometric probe to be heavily protected in a zone where thermal shocks are small, and to therefore have its useful life protracted. Moreover, since the total duration of the cycle remains constant, it is possible to synchronize a plurality of lines successively feeding in during their manufacturing phases, without incurring any loss of time and consequently of production. Finally, a failure of the pyrometer will no longer result in the heating or manufacturing phase being protracted until the safety devices are triggered.

The invention will be clearly understood from the accompanying drawing, in which.

Figure 1:
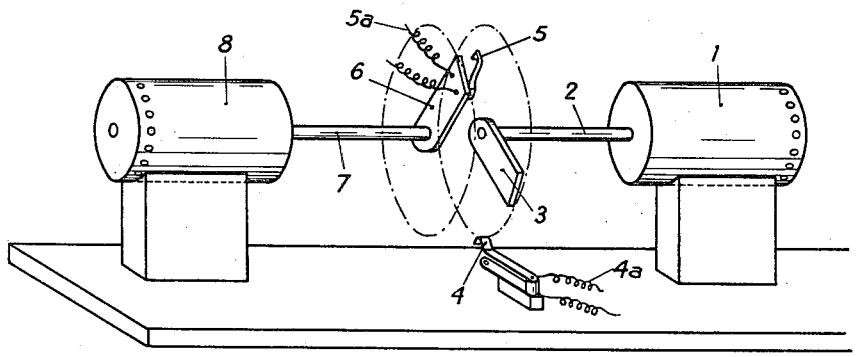
FIGURE 1 is a highly diagrammatic perspective view of an apparatus for performing the invention.

The device in accordance with the invention, illustrated in FIGURE 1 by way of example only and not in any limiting sense, comprises a motor 1 equipped with a reduction unit, and on the shaft 2 of this motor is mounted an arm 3 which travels in a plane perpendicular to the shaft 2. The latter rotates uniformly and its rotational speed is calculated so that a complete revolution of the arm 3 corresponds to the total duration of a cycle in the process under consideration.

In the course of its revolution, the arm 3 bears against a fixed contact 4 which then closes a circuit 4a, thereby establishing the end of the manufacturing phase. Said arm 3 also bears against a contact 5 of a lever 6 revolving in a plane parallel to that of arm 3. Lever 6 is mounted on the end of a shaft 7 located in the extension of the axis of shaft 2 and driven by a motor 8. Said contact 5 controls a circuit 5a, closure of which terminates the heating phase.

To perform the various control operations, circuits 4a and 5a can advantageously form part of a bridge controlling the supply to a cam-type master controller such as the one described in the aforementioned patent specification Serial Number 1,113,683.

The motor 8 is connected across the output terminals 9 and 10 of an A.C. mains supply. It comprises a winding 11, which, on becoming the seat of an electric current, causes it to rotate in the direction of the arrow 12, and a further winding 13 which, on becoming the seat of an electric current, causes said motor to rotate in the opposite direction, shown by arrow 14. A switch 15 is inserted between terminal 10 and windings 11 and 13, and this switch closes the circuit via winding 11 or 13, through 16 or 17 respectively.

The switch 15 is operated by a pyrometer 18 the thermocouple 19 of which is inserted into a suitable point in the reaction chamber. Contact is established with 16 or with 17, that is to say the current passes through one or the other of motor windings 11 and 13, according to whether the temperature measured by the pyrometer shows a positive or negative difference with respect to the preset value on the pyrometer dial 20.

The motor 8 is geared to rotate very slowly, say at the rate of one revolution in 30 minutes, so that the duration of a revolution of the shaft 7 is distinctly longer than the duration of one cycle. The mean rate of revolution of the motor can be adjusted by causing the current supply via the terminal 9 to be rendered intermittent but of predetermined frequency and duration, by means of an auxiliary contact 21 of which opening and closure are controlled by a cam 22.

The control device according to the invention functions in the following manner:

The arm 3 uniformly revolved by the motor 1 completes one revolution in a time equal to the duration of a complete cycle in the process being applied. During that revolution said arm bears against the contact 4 and hence closes the circuit 4a which terminates the manufacturing phase. This particular instant may be regarded as the initial point of the cycle. A timing device (not shown) then provokes the draining operations during an intermediate phase of predetermined duration, and then triggers the heating phase which is pursued until the arm 3 bears against the contact 5 on lever 6. When this occurs, the circuit 5a closes and terminates the heating phase. A further timed sequence controls the draining operation in the course of an intermediate phase of predetermined duration, then triggers the manufacturing phase. The latter is pursued until the arm 3 bears against the contact 4. Said arm 3 will close the circuit 4a after it has completed a full revolution the duration of which is determined by the rotational speed of the shaft 2. Thus it will be seen that the total duration of the cycle remains constant, but that the individual durations of the heating and manufacturing phases depend upon the angular position of the lever 6.

Figure 3:
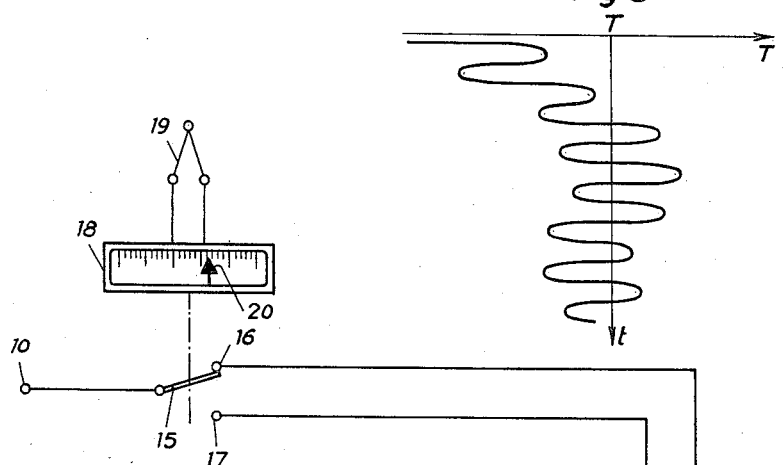
FIGURE 3 is a diagram in which temperature is plotted against time.
Figure 2:
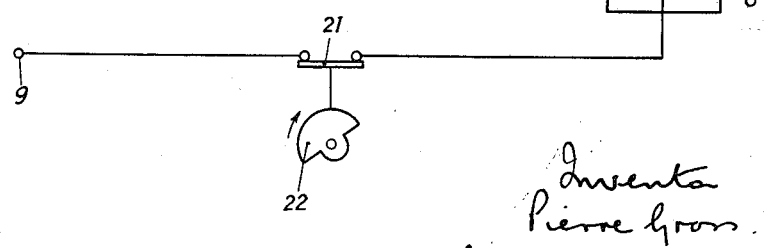
FIGURE 2 is an electrical wiring diagram of part of the apparatus of FIGURE 1.

The lever 6 is revolved very slowly by the motor 8. Its direction of rotation depends upon the temperature detected by the pyrometer, as opposed to a mean preselected temperature set up on the dial 20. Considering, for instance, the case of the heating phase, the temperature in the reaction chamber at the beginning of that phase will be less than the selected mean temperature T, so that, by acting upon the switch 15, the pyrometer will close the circuit via winding 11 of motor 8, thereby causing the shaft 7 to rotate in the same direction as the shaft 2 and to consequently increase the duration of the heating phase. Once the temperature detected by the pyrometer exceeds the temperature T, contact will be established at 17 in order to cause the motor 8 to rotate in the opposite direction, namely in the direction tending to shorten said phase. The same process applies for the manufacturing phase. Thus the graph of temperature plotted against time (FIGURE 3) produces a curve having oscillations of constant period but variable amplitude which, following starting, gradually move towards the preset temperature. Once this temperature has been reached under normal working conditions, the oscillations deviate from side to side of the axis corresponding to the temperature T, and the envelope bounding this oscillating curve itself consists of two sinusoidally shaped curves, damped in varying degrees, and cutting across the axis T.

It will be seen therefore that the slow displacement of lever 6 by motor 8 corrects the relative durations of the heating and manufacturing phases, thereby ensuring regulation of the reaction temperature.

Instead of making rotation of the motor 8 continuous, it may be made discontinuous by means of the switch 21 operated by the cam 22. In this way, at regular time intervals, the position of the lever 6 sustains correction in accordance with the indications given by the pyrometer at the instant the contact 21 is closed.

If the amplitude of the pyrometer temperature undulations is negligible in relation to the frequency of the cycle, then the cam contact 22 can be driven by an independent motor, and its chief function will then be to ensure optimum regulating, by suitably proportioned impulses, of the corrective speed of the shaft 7 of motor 8.

If the opposite is the case, then it will be necessary to cause the pyrometric correction to take place always at the same precise instant in the cycle, that is to say that the cam 22 cooperating with the contact 21 must be synchronized with the cycle, for example by being driven directly off the shaft 2 of motor 1. The mean rate of revolution of the motor 8 can then be regulated by adjusting, for each cycle, the closing time of contact 21 by changing the cam profile.

Obviously, the specific embodiment shown in FIGURE 1 is given by way of example only, and many modifications may be made to it without departing from the scope of the present invention. Thus, instead of utilizing electrical contacts 4 and 5, provision could be made for hydraulic, pneumatic or other devices to generate, on passage of the arm 3, a signal capable of triggering the required operations. For it will suffice to have a signal which is emitted at time intervals equal to the duration of the cycle and which provokes the end of the manufacturing (or heating) cycle, and a further signal which is emitted a variable length of time after the first signal and which provokes the end of the heating (or manufacturing) phase, the time-lapse between the fixed signal and the variable signal being determined by comparison, during the cycle, of the temperature detected by the thermocouple with the temperature value preset on the pyrometer.

What is claimed is:

1. An apparatus for controlling in a cyclic process the durations of two distinct partial process periods within a process cycle of constant duration, comprising, in combination, first timing means for furnishing periodically at time intervals equal to the constant total duration of the process cycle a first control signal adapted to start the first one of said distinct partial process periods, said first timing means including a normally open stationary switch means adapted to cause said first control signal when moved to closed position, a rotary actuator member arranged to move said stationary switch means to closed position once during each revolution of said rotary member, and first motor means for rotating said rotary member at a speed at which the time period of one full revolution is equal to the constant duration of the process cycle; second, variable timing means for furnishing a second control signal adapted to start the second one of said distinct partial process periods a variable time period after said first control signal, said second timing means including second normally open switch means adapted to cause said second control signal when moved to closed position, a second rotary member carrying said second switch means along a circular path coaxial with the rotation of said rotary actuator member and arranged to cause said second switch means to be moved to closed position when said rotary actuator member meets said second switch means, and second motor means for rotating said second rotary member at a speed substantially slower than said speed of said rotary actuator member; means for detecting a measurable physical characteristic of the cyclic process; and means for comparing the value of such detected characteristic with a predetermined value of said characteristic and for controlling, depending upon an existing difference between said values, said variable timing means so as to vary said variable time period, whereby the ratio of said durations of said partial process periods is modified automatically depending upon an existing difference between said predetermined and said detected value of said characteristic.

2. An apparatus for controlling in a cyclic process the durations of two distinct partial process periods within a process cycle of constant duration, comprising, in combination, first timing means for furnishing periodically at time intervals equal to the constant total duration of the process cycle a first control signal adapted to start the first one of said distinct partial process periods, said first timing means including a normally open stationary switch means adapted to cause said first control signal when moved to closed position, a rotary actuator member arranged to move said stationary switch means to closed position once during each revolution of said rotary member, and first motor means for rotating said rotary member at a speed at which the time period of one full revolution is equal to the constant duration of the process cycle; second, variable timing means for furnishing a second control signal adapted to start the second one of said distinct partial process periods a variable time period after said first control signal, said second timing means including second normally open switch means adapted to cause said second control signal when moved to closed position, a second rotary member carrying said second switch means along a circular path coaxial with the rotation of said rotary actuator member and arranged to cause said second switch means to be moved to closed position when said rotary actuator member meets said second switch means, and second motor means for rotating said second rotary member alternatively in one or the opposite direction at a speed substantially slower than said speed of said rotary actuator member; means for detecting a temperature characteristic of the cyclic process; and means for comparing the value of such detected temperature characteristic with a predetermined value of said temperature characteristic and for controlling, depending upon an existing difference between said values, said variable timing means so as to vary said variable time period by changing the direction of rotation of said second motor means in one or the other direction, as the case may be, whereby the ratio of said durations of said partial process periods is modified automatically depending upon an existing difference between said predetermined and said detected value of said temperature characteristic.

3. An apparatus as claimed in claim 1, including control means for energizing said second motor means intermittently, said control means including a switch in the energy supply for said second motor means and movable between open and closed positions, actuating means for moving said switch between said positions, and drive means for periodically operating said actuating means.

4. An apparatus as claimed in claim 1, including control means for energizing said second motor means intermittently, said control means including a switch in the energy supply for said second motor means and movable between open and closed positions, actuating means for moving said switch between said positions and drive means for causing periodical operation of said actuating means by said first motor means.

References Cited in the file of this patent

UNITED STATES PATENTS

| 1,828,461 | Evans | Oct. 20, 1931 |
| 2,153,057 | Allen | Apr. 4, 1939 |
| 2,761,655 | Lunden et al. | Sept. 4, 1956 |

FOREIGN PATENTS

| 1,113,683 | France | Dec. 5, 1955 |